United States Patent [19]

Nagata et al.

[11] 4,280,950

[45] Jul. 28, 1981

[54] MOLDING HAVING GRAIN OF A NATURAL MATERIAL AND METHOD FOR PRODUCING SAME

[75] Inventors: Yoshiaki Nagata; Shinya Fukui, both of Osaká, Japan

[73] Assignee: Hexa Chemical, Osaka, Japan

[21] Appl. No.: 64,736

[22] Filed: Aug. 8, 1979

[51] Int. Cl.$^3$ .................. C08L 71/04; C08L 25/06; C08L 23/12
[52] U.S. Cl. ................... 260/42.21; 264/73; 260/37 R; 260/DIG. 26; 521/180; 525/132
[58] Field of Search ............... 264/73, 74–77; 525/132; 260/42.21, DIG. 26, 37 R; 521/180

[56] References Cited

U.S. PATENT DOCUMENTS

| | | | |
|---|---|---|---|
| 3,665,058 | 5/1972 | Snodgrass et al. | 525/151 |
| 4,045,382 | 8/1977 | Braese et al. | 525/151 |
| 4,051,096 | 9/1977 | Koseki et al. | 525/146 |
| 4,126,724 | 11/1978 | Randall | 264/73 |
| 4,128,602 | 12/1978 | Katchman | 525/132 |
| 4,137,215 | 1/1979 | Van Gasse | 264/77 |

Primary Examiner—Earl A. Nielsen
Attorney, Agent, or Firm—Koda and Androlia

[57] ABSTRACT

A molding having a grain resembling a natural material such as wood, stone and the like and a method for producing the same are disclosed. The molding is made of a mixture of a colored polyphenyleneoxide resin and a thermoplastic resin. The polyphenyleneoxide resin has a low fluidity to form patterns, while the thermoplastic resin has a high fluidity to form a body.

5 Claims, No Drawings

MOLDING HAVING GRAIN OF A NATURAL MATERIAL AND METHOD FOR PRODUCING SAME

BACKGROUND OF THE INVENTION

1. Field of the Invention

This invention relates to moldings having grains resembling a natural material, such as wood and stone and to a method for producing the same.

2. Prior Art

There have been a number of proposals on products such as vehicle parts, sundry goods, furniture, construction materials and cabinets for various electric products having a surface resembling the grain of natural wood, marble, etc. Such surfaces have been formed by the disposition of cells and tissues of those materials. There have been various techniques in use including print coating, hot stamping and ink dropping. All these techniques are applied only as a secondary processing of those products. Therefore, there have been such disadvantages and problems as high cost, exposure of inner materials due to scratches, wear due to friction and fading of colors etc.

SUMMARY OF THE INVENTION

Accordingly, it is the primary object of this invention to provide a molding which is free from all the disadvantages mentioned above.

It is another object of this invention to provide a method for producing a molding whose surface gives a look of natural wood texture, stone texture, and the like.

In keeping with the principles of this invention, the objects are accomplished by a unique process comprising the steps of mixing 0.1-20% by weight of colored modified polyphenyleneoxide resin with 80-99.9% by weight of thermoplastic resin selected from the group consisting of styrene resin, polyolefin resin, polyvinyl chloride, and polymethylmethacrylate resin, and molding thus prepared resin mixture at a temperature of 170°-300° C.

By mixing those resins, there is created texture on the surface of the molding resembling natural material such as wood, stone, etc. More specifically, the basal thermoplastic resin has a high fluidity in the molding temperature range and the colored modified polyphenylenoexide resin has a low fluidity in the temperature range. The method of this invention is characterized by the utilization of the difference in fluidity between the basal thermoplastic resin and colored resin which are to constitute patterns in the molding temperature range.

The present invention employs colored modified polyphenyleneoxide resin to form the grain ("Noryl", trademark of General Electric Co.). Unlike colored or non-colored basal thermoplastic resin, the resin added for formation of patterns is required to have a extremely low fluidity in the molding temperature range. The composition of the resin added for formation of patterns is 0.1-20% by weight of the modified polyphenyleneoxide resin as a substance of low fluidity. Because if the modified resin is added in more than that ratio, an exfoliation phenomenon takes place, which spoils the quality of the products. While modified polyphenyleneoxide resin is especially employed as a substance of low fluidity, it is also possible to use some other thermoplastic resins or such thermoplastic resins whose fluidity is lowered by admixing metallic oxides, glass fiber, glass powder or other inorganic substances. Moldings having equal patterns resembling wood/stone grain can also be obtained by admixing thermosetting resins. Further, colorful polychromatic patterns resembling wood/stone grain etc. can also be obtained by using two or more modified polyphenyleneoxide resins of different colors, or by using a colored modified polyphenyleneoxide resin with other resins of low fluidity which were differently colored (See Example 12).

It is necessary that colored or non-colored thermoplastic resins have a high fluidity in the range of molding temperatures. Not only thermoplastic resins showing high fluidity as its original characteristics, colored pellets whose fluidity is improved in the molding temperatures when pelleted with knead-mixing extruders can also be used. Contrasting with colored modified polyphenyleneoxide resins of low fluidity, resins of high fluidity include polystyrene of average grade (PS-GP), impact resistant polystyrene (PS-HI), high-impact polystyrene (PSHI 50%), styrene-acrylonitrile copolymers (AS), ABS resin as styrene resin group, and polypropylene (PP), high-density polyethylene (HD-PE), methylpentene resin (TPX) as polyolefin resin group, polyvinyl chloride (PVC), and polymethylmethacrylate resin (PMMA), etc.

To 80-99.9% by weight of such colored or non-colored basal thermoplastic resins, 0.1-20% by weight of colored modified polyphenyleneoxide resin which are to form grains resembling wood/stone texture are added in the form of colored pellets, and the mixture is molded with various molding machines in the temperature range of about 170°-300° C. Sufficiently clear grains resembling wood textures etc. are obtainable in the temperature range of about 170°-300° C. Still more clear cut grains like wood texture etc. are obtainable if the temperature range is raised from 180°-200° C.

In this invention, mold goods with wood/stone grain patterns on mat surfaces are also obtainable by applying a matting treatment. To 100 parts of the mixture of colored or non-colored basal thermoplastic resin and colored modified polyphenyleneoxide resin, one of the three substances of blowing agents, synthetic rubber, or an inorganic material or a combination of synthetic rubber and an inorganic material in 0.1-15 parts is added. When molded together, products with mat surfaces are obtained.

Molding machines and injection molding machines of the in-screw type can be used. Extrusion molding machines, injection blow molding machines, etc. can also be used. To form clear cut patterns with the injection molding machines, the cylinder should be larger in diameter, short in length and the revolution rate should be low and receding speed of the screw should be higher. A larger cylinder capacity is an advantage. The injection rate should be low, though the effect of a turbulent flow becomes significant when the rate is remarkably low. The injection time is correlated to the revolution rate of screws. Generally, thickness of mold goods should be larger a uniform thickness being most desirable. Mold goods with extremely uneven thickness should preferably be avoided. When molding is conducted under the above conditions, it is possible to obtain, without the expensive secondary processing, moldings which have patterns resembling wood/stone grains etc. both on the surface or inside the material, which are free from the exposure of inner tissues due to scratches, from wear due to friction and from fading of colors and which are capable of producing in a specified pattern with the proper selection of metal pattern gates and injection conditions. It therefore seems that the subjects of this invention have been satisfied. The following examples illustrate the invention.

EXAMPLES 1-10

To colored modified polyphenyleneoxide resin or its modified body, each of the following colored or non-colored basal thermoplastic resins of (1)-(10) was added, the mixture was molded under the respective temperature conditions for molding (range of optimal conditions are shown) and moldings having clear patterns resembling wood/stone grain etc. were obtained.

| BASAL THERMOPLASTIC RESINS | | RANGE OF OPTIMAL TEMPERATURES |
|---|---|---|
| (1) | polystyrene of average grade (PS-GP) | 180–210° C. |
| (2) | impact-resistant polystyrene (PS-HI) | 180–210 |
| (3) | high-impact polystyrene (PS-HI 50%) | 180–210 |
| (4) | ABS resin | 190–220 |
| (5) | styrene-acrylonitrile copolymers (AS) | 190–220 |
| (6) | polypropylene (PP) | 180–210 |
| (7) | high-density polyethylene (HD-PE) | 180–210 |
| (8) | methylpenten resin (TPX) | 180–210 |
| (9) | polyvinyl chloride (PVC) | 180–220 |
| (10) | polymethylmethacrylate | 210–220 |

EXAMPLE 11

To 100 parts of mixed resins consisting of colored or non-colored basal thermoplastic resin and either colored modified polyphenyleneoxide resin or its body, either one of (1) 0.1–0.8 parts of azodicarbonamide as a foaming agent, (2) 1–5 parts of styrenebutadiene rubber as a synthetic rubber, or (3) 3–5 parts of one of silicon dioxide, calcium carbonate, calcium sulfate, magnesium sulfate, talc, aluminum oxide, or aluminum hydroxide as an inorganic material or 3–5 parts of a combination of (2) and one of (3) was added, then the mixture was molded. Moldings thus obtained had wood texture and the like patterns on mat surfaces formed under optimal conditions.

EXAMPLE 12

Moldings having polychromatic patterns resembling stone grain etc. were obtained by using colored or non-colored basal thermoplastic resin and the following combinations of A, B, C and D of colored modified polyphenyleneoxide resin. Each resin of A, B, C and D was designed for producing polychromatic contrasts, and their degree of modification are differentiated. The degree of modification is selected depending on the difference of the range of molding temperatures and type of molding machines. A and D provided less distinct patterns and B and C gave patterns with clear lines. Furthermore, it is desirable that the combination rate of A, B, C and D to the total is set at below 20% or so by weight.

| | | |
|---|---|---|
| A - | denatured polyphenyleneoxide resin | 50 parts |
| | impact-resistant polystyrene | 50 parts |
| | pigment | 1 part |
| B - | denatured polyhenyleneoxide resin | 60 parts |
| | impact-resistant polystyrene | 40 parts |
| | pigment | 1.8 parts |
| C - | denatured polyphenyleneoxide resin | 60 parts |
| | impact-resistant polystyrene | 40 parts |
| | pigment | 1.4 parts |
| D - | denatured polyphenyleneoxide | 50 parts |
| | impact-resistant polystyrene | 50 parts |
| | pigment | 1.2 parts |

We claim:

1. A molding having a grain resembling a natural material comprising a mixture of 0.1–20% by weight of colored modified polyphenyleneoxide resin and 80–99.9% by weight of thermoplastic, said thermoplastic resin having a higher fluidity in the range of molding temperature than said polyphenyleneoxide resin and selected from group consisting of styrene resin, polyolefine resin, polyvinylchloride resin and polymethylmethacrylate resin.

2. A method for making molding having a grain resembling a natural material which comprises admixing 0.1–20% by weight of colored modified polyphenyleneoxide resin with 80–99.9% by weight of thermoplastic resin and molding said mixed resin in a molder at a temperature of 170°–300° C.

3. A method according to claim 2, wherein said thermoplastic resin is selected from the group consisting of styrene resin, polyolefin resin, polyvinyl chloride resin and polymethylmethacrylate resin.

4. A method according to claim 2, further comprising the steps of adding 0.1–15 parts of one selected from the group consisting of blowing agents, synthetic rubber, inorganic material and a mixture of synthetic rubber and inorganic material to 100 parts of the mixture of said resins, and molding the mixture at a temperature of 170°–300° C.

5. The method as claimed in claim 3, wherein a molder is selected from the group consisting of injection molders, extrusion molders and injection blowing molders.

* * * * *